United States Patent [19]

Hale

[11] Patent Number: 4,813,991

[45] Date of Patent: Mar. 21, 1989

[54] UNIVERSAL STEM MOLD FOR MANUFACTURING A MOLDED GLASS STEM

[75] Inventor: John R. Hale, East Hempfield Township, Lancaster County, Pa.

[73] Assignee: Thomson Consumer Electronics, Inc., Indianapolis, Ind.

[21] Appl. No.: 196,595

[22] Filed: May 20, 1988

[51] Int. Cl.⁴ ............................................. C03B 23/13
[52] U.S. Cl. ....................................... 65/139; 65/59.25; 65/59.27; 65/59.31; 65/59.7; 65/138; 65/155
[58] Field of Search ............. 65/138, 139, 59.7, 59.32, 65/59.31, 59.27, 59.26, 59.25, 155, 173, 59.28

[56] References Cited

U.S. PATENT DOCUMENTS

| | | | |
|---|---|---|---|
| 2,107,254 | 2/1938 | Horn | 65/59.27 X |
| 2,313,025 | 3/1943 | Scharfnagel | 65/138 |
| 2,338,507 | 1/1944 | Haas et al. | 250/27.5 |
| 2,340,879 | 2/1944 | Horn | 49/81 |
| 2,781,613 | 2/1957 | Watkins | 65/139 |
| 3,201,216 | 8/1965 | Handmann | 65/138 |
| 4,612,029 | 9/1986 | Kramer et al. | 65/155 X |

OTHER PUBLICATIONS

U.S. patent application, Ser. No. 114,356 filed on Oct. 29, 1987 by J. R. Hale titled, Apparatus and Method for Manufacturing a Molded Glass Stem, U.S. Pat. No. 4,767,436.

Primary Examiner—Arthur Kellogg
Attorney, Agent, or Firm—Eugene M. Whitacre; Dennis H. Irlbeck; Vincent J. Coughlin, Jr.

[57] ABSTRACT

An apparatus for manufacturing a glass stem for an electron tube has a plurality of lead-in conductors and a plurality of fillets with the lead-in conductors extending through the fillets. The apparatus comprises a first stem mold assembly and a second stem mold assembly for forming the stem therebetween. The first stem mold assembly comprises a universal stem mold having a plurality of longitudinal fillet-forming openings formed through a mold block. A plurality of inserts are replaceably disposed and retained within the openings in the mold block. Each of the inserts has a first end, an oppositely disposed second end, and a shank portion therebetween. Each of the inserts has a recess provided in the first end and a lead-accommodating opening extending from the recess into the shank portion of the insert. The mold block also accommodates one or more solid inserts in the openings to produce stems having dummy fillets, i.e., fillets without lead-in conductors therethrough.

7 Claims, 5 Drawing Sheets

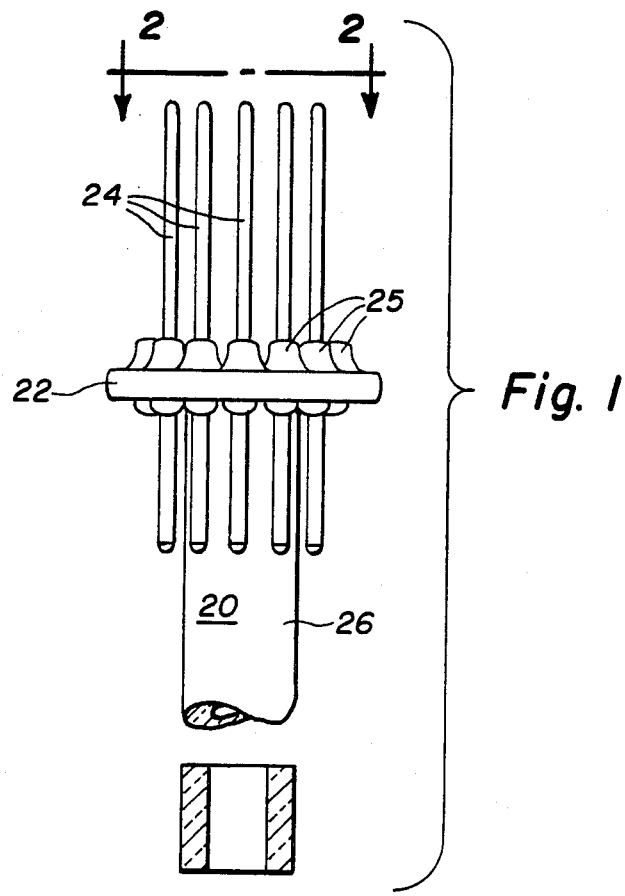
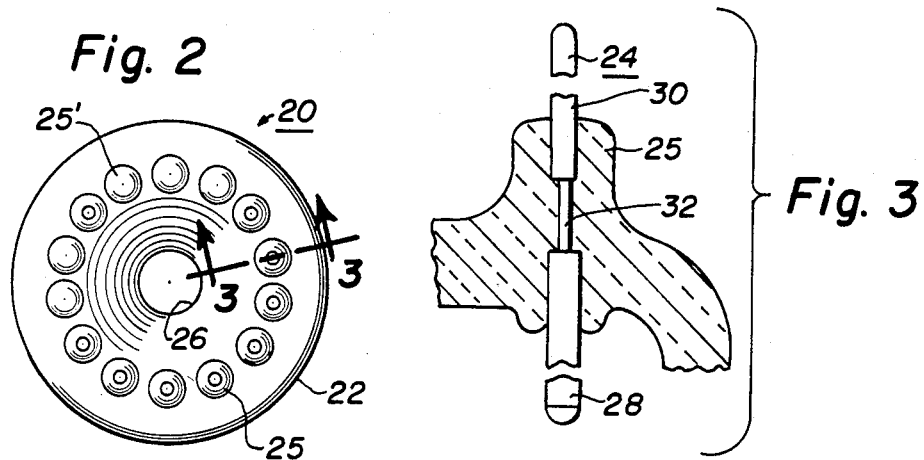

UNIVERSAL STEM MOLD FOR MANUFACTURING A MOLDED GLASS STEM

BACKGROUND OF THE INVENTION

The invention relates to an apparatus for manufacturing a glass stem, and more particularly to a universal stem mold having improved fillet-forming means. The glass stem comprises a number of lead-in conductors (or leads) usually ranging from five to twelve for a cathode-ray tube, CRT, each extending through a glass disk in a direction perpendicular to the plane of the disk and forming a circular array of leads. Typically, the leads comprise three component parts: an outer lead, an inner lead and a central press lead. The leads are round, copper sheathed, 42 percent nickel-iron wire, coated with fused sodium tetraborate. This lead material is commonly known as dumet. Alternatively, a one-piece lead of 52 alloy (52% nickel, balance iron) may be used. Where dumet is used, a glass fillet surrounds the junction of the outer, press, and inner leads to provide structural strength.

U.S. Pat. No. 3,201,216 issued to Handmann on Aug. 17, 1965 describes an apparatus for producing an electronic tube stem. Such a stem is usually made by inserting the leads in holes in a rotatable lower portion of a stem mold assembly which is mounted on an indexable turret. A glass cylinder is placed on the lower stem mold assembly around or within the leads (or both) and then the leads and the glass cylinder are heated to melt the glass. The glass cylinder is pressed into a disk in which the leads are embedded. Each of these operations takes place at an indexed position of the turret. During the heating operation, the leads, the glass cylinder, and the lower portion of the stem mold assembly, are rotated to uniformly heat the glass. During the pressing step, the upper portion of the stem mold assembly is pressed down onto the glass cylinder. Usually, the upper mold assembly is either rotated in synchronism with, and in properly indexed relation to, the lower mold assembly, or the lower mold assembly is stopped in properly indexed position relative to the stationary upper mold assembly. When the upper mold assembly is lowered to the pressing position, the leads extend into lead receiving holes in the upper mold assembly. As is known in the art, a tubulation is usually centrally disposed within the disk to permit evacuation and seal-off of the CRT. While most rotary stem machines have 24 or 30 lower stem mold assembly positions, there usually are only two, three or four upper mold assembly positions on a stem machine, the actual number reflect the preference of the machine designer. Where there are a plurality of pressing positions, reheating of the stem occurs between each pressing position (or station). The upper mold assemblies differ slightly from station-to-station and can be thought of, for convergence, as progressing from a rough press to a finished press. This change in upper stem mold assembly configurations makes it inconvenient and expensive to change the stem design, for example to change either the inner lead diameter or length, the fillet shape, or the location of a dummy fillet, i.e., a fillet without a lead therethrough, or the number of leads or dummy fillets per stem. Even if a stem machine is dedicated to producing only one type of stem, occasionally it is necessary to replace the portion of the upper mold assembly (called the mold block) which contacts the glass, because the hot glass of the stem eventually erodes the bridge between adjacent fillets resulting in a reentrant angle in the glass which causes cracked stems. Also the hot nickel-iron inner leads wear the lead accommodating holes in the mold block causing the originally circularly-shaped holes to become oblong resulting in displacement of the pin circle and/or bent leads.

SUMMARY OF THE INVENTION

An apparatus for manufacturing a glass stem for an electron tube comprises an improved first stem mold assembly and a conventional second stem mold assembly for forming the stem therebetween. The improved first mold assembly comprises a universal stem mold having a plurality of longitudinal fillet-forming openings formed through a mold block. A plurality of inserts are replaceably disposed and retained within the openings in the mold block. Each of the inserts has a first end, an oppositely disposed second end, and a shank portion therebetween. Each of the insets has a recess provided in the first end and a lead-accommodating opening extending from the recess into the shank portion of the insert.

BRIEF DESCRIPTION OF THE DRAWINGS

FIG. 1 is a partially cut-away longitudinal view of a stem having internal leads of equal length.

FIG. 2 shows a top view taken along line 2—2 of FIG. 1.

FIG. 3 is a partial sectional view taken along line 3—3 of FIG. 2.

DETAILED DESCRIPTION OF THE PREFERRED EMBODIMENT

Figure 4:
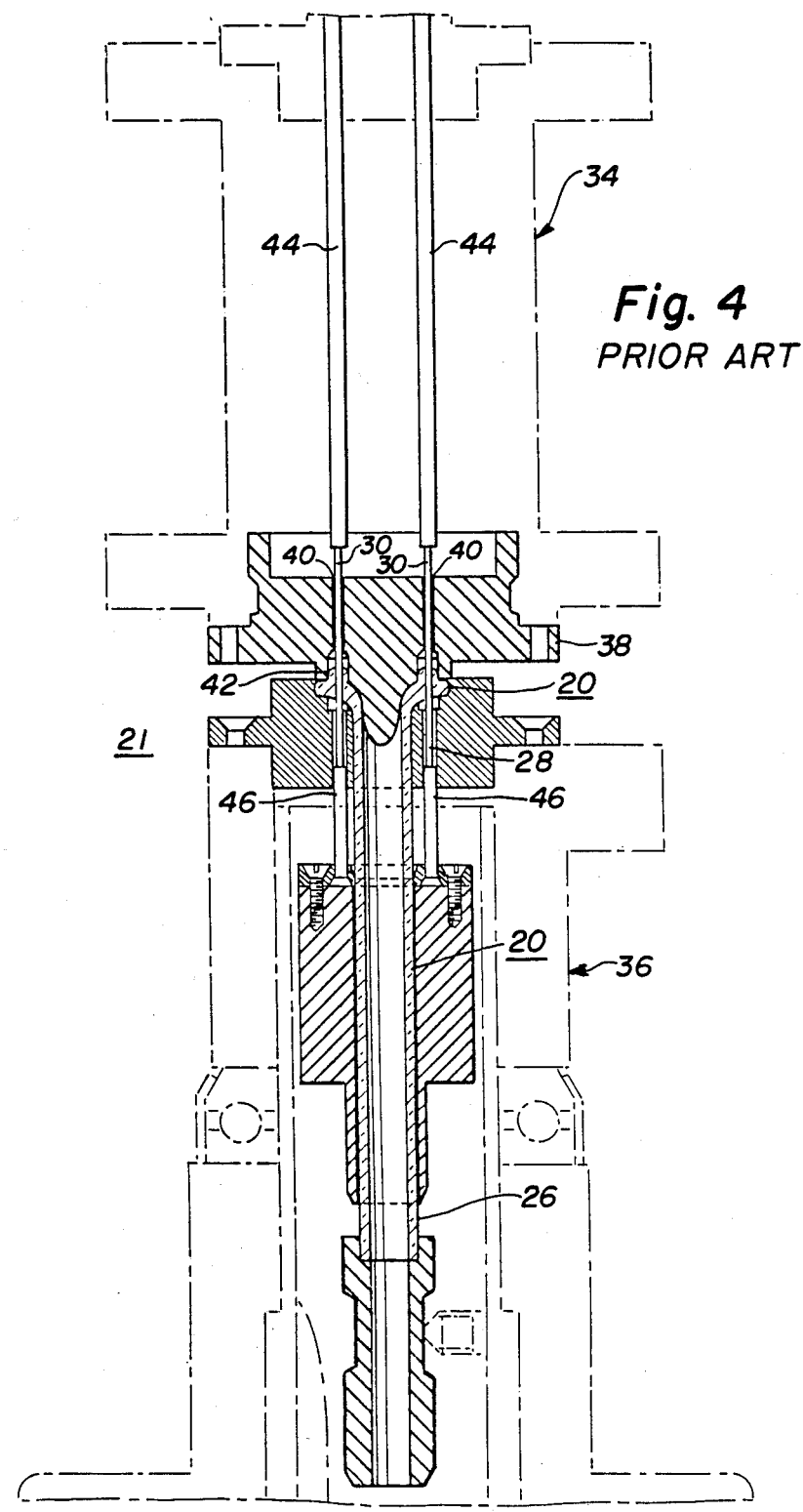
FIG. 4 is a cut-away sectional view of a portion of a conventional stem manufacturing apparatus showing a first and a second stem mold assembly.

FIGS. 1, 2 and 3 show a stem 20 that may be made by any of the stem manufacturing apparatus described herein. A conventional stem manufacturing apparatus 21 is shown in FIG. 4. The stem 20 is used in a electron tube (not shown) such as a cathode-ray tube, CRT. The stem 20 includes a glass disk 22 having a plurality of lead-in conductors or leads 24 extending through a plurality of fillets 25. One or more dummy fillets 25', i.e., fillets without leads therethrough, also are provided. A tubulation 26 is integral with the glass disk 22 and provides a means for evacuating and sealing the evacuated electron tube. Each of the leads 24 includes an outer lead 28, an inner lead 30 and a press lead 32.

As shown in FIG. 4, the stem 20 is made by using the apparatus 21 which comprises a first (or upper) stem mold assembly 34 (only a portion of which is shown) and a second (or lower) stem mold assembly 36 (only a portion of which is shown). The upper stem mold assembly 34 includes a mold block 38 having a plurality of precisely formed apertures 40 extending longitudinally through the body thereof to accommodate the inner leads 30 of the stem 20. The apertures 40 have a diameter of about 0.89 mm (0.035 inch) and are located on a 15.24 mm (0.60 inch) pin circle. The apertures 40 must not be tapered and each aperture enters into a fillet-forming cavity 42 which is provided in the glass-contacting surface of the mold block 38. A plurality of lead-weights 44 contact the ends of the inner leads 30 with sufficient weight to urge the outer leads 28 against supports 46 in the lower stem mold assembly 36.

Figure 5:
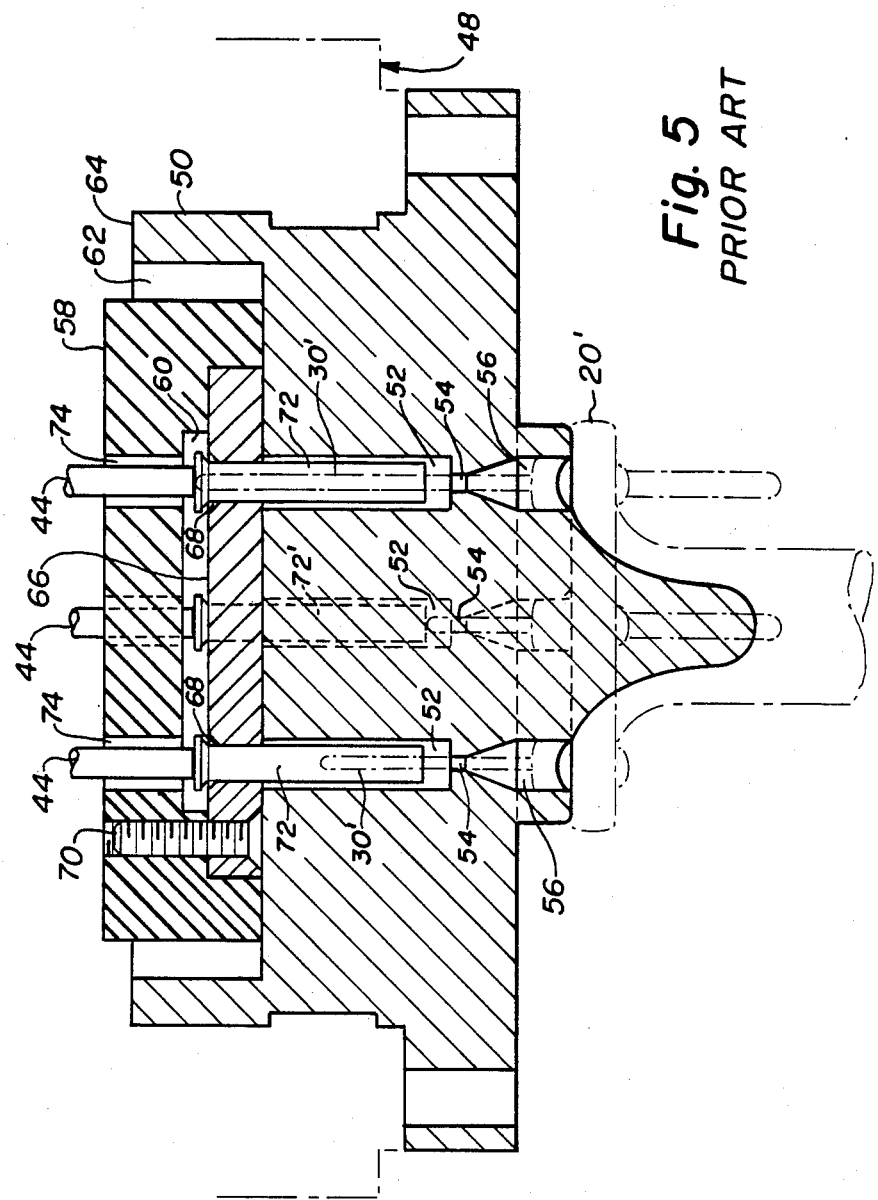
FIG. 5 shows a portion of another first mold assembly for producing stems having internal leads of various lengths.

In order to provide stems 20 having inner leads 30 of different lengths, to accommodate the internal components of electron tubes, it is necessary to either trim the inner leads to the desired length after manufacturing—a practice that is discouraged because such a trimming operation requires additional processing and handling and occasionally results in a decrease in yield because of trimming-induced damage to the stem—or to adjust the lengths of the lead-weights to accommodate leads of different inner lengths. The latter alternative is unsatisfactory because variations in the lengths of the leads 24 beyond design tolerances result either in insufficient contact between the lead-weights 44 and the inner leads 30, or excessive contact and bending of the inner leads. To overcome this problem, a modified first mold assembly 48, which is shown in FIG. 5, and which accommodates different inner lead lengths without changes in the lengths of the lead-weights 44 was developed and is described in my copending U.S. patent application Ser. No. 114,356, filed on Oct. 29, 1987, now U.S. Pat. No. 4,767,436.

The modified first mold assembly 48 is similar in appearance to the mold assembly 34. However, it utilizes a modified mold block 50 having a plurality of buffer-pin-wells 52 formed therein which communicate through guide openings 54 with fillet-recesses 56. A translator 58, having a translator recess 60 formed in one surface thereof, is disposed within a cavity 62 formed in a major surface 64 of the mold block 50. A pin holder 66 having a plurality of pin apertures 68 is disposed within the translator recess 60 and is suitably attached to the translator 58 by one or more screws 70. A plurality of buffer pins, designated 72, extend through the pin apertures 68 in the pin-holder 66 and into the pin wells 52 in the mold block 50. The lead-weights 44, of equal length, extend through lead-weight apertures 74 in the translator 58 and contact one end of the buffer pins 72. Where it is desired to provide a stem 20' having inner leads 30' of different lengths, the buffer pins 72 can be bored to accommodate the inner leads 30' and act as lead-stops. Solid pins 72', cut to the desired length, contact the shortest inner leads.

The modified first mold assembly 48 adequately addresses the problem of producing stems with inner leads of different lengths without also having to modify the lengths of the lead-weights 44; however, both the conventional mold block 38 and the modified mold block 50 have integral fillet recesses 42 or 56, and accurately bored lead-accommodating apertures 40 or guide openings 54 which are specifically designed to produce only one-type of stem. If the fillet recesses of the mold block begins to wear so that the fillets of the stem become distorted, or the leads become eccentrically located within the fillets, the entire mold block must be replaced. Also, if it is desired to change either the number of leads per stem, the location of the dummy fillets 25', or the diameter of the inner leads, a new mold block must be produced for each variation.

Figure 6:
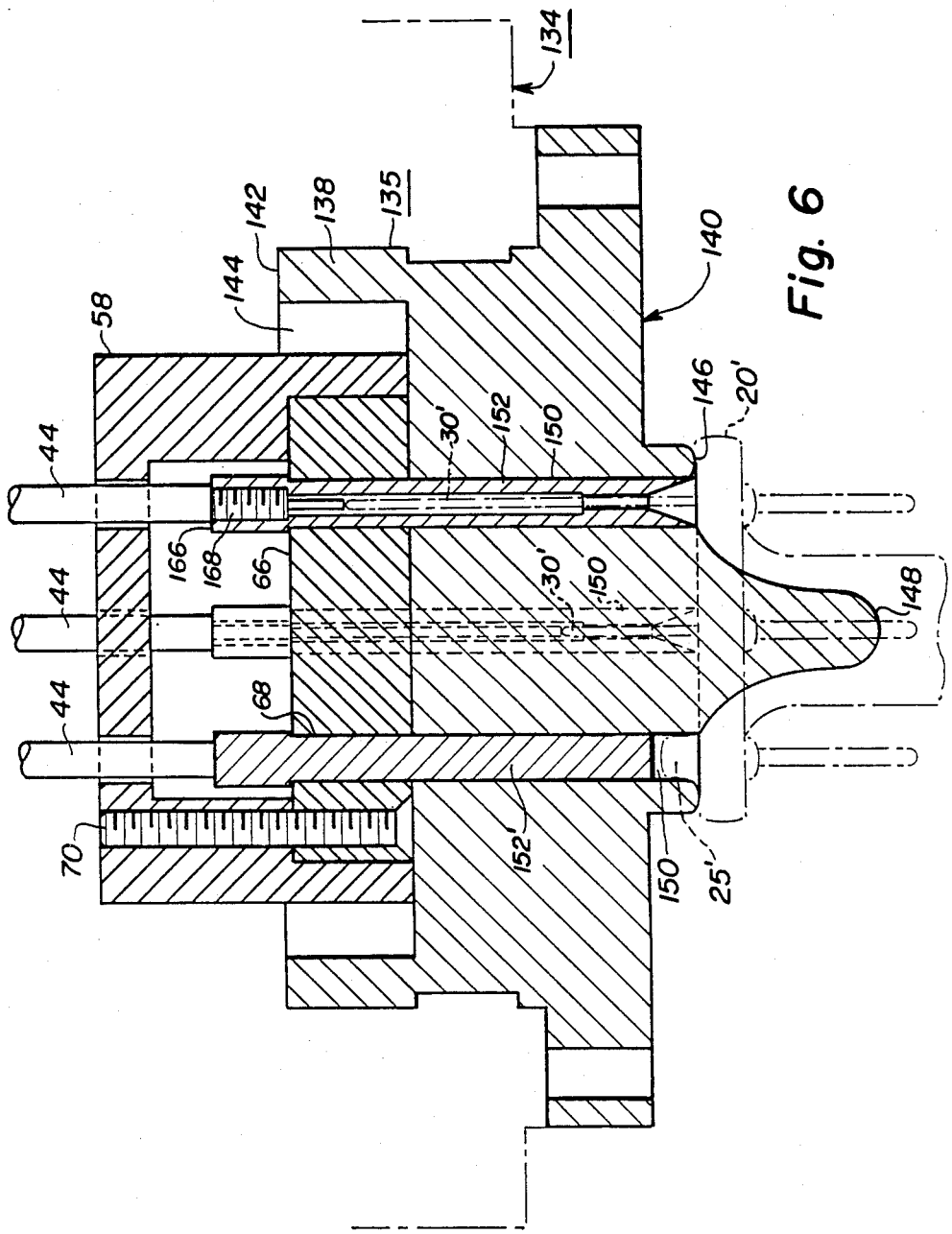
FIG. 6 shows a first embodiment of a first mold assembly according to the present invention.

As shown in FIG. 6, an improved first or upper stem mold assembly 134 includes a plurality of conventional lead weights 44 and a novel universal stem mold 135 having an improved mold block 138 with a first surface 140 and an oppositely disposed second surface 142. A cavity 144 is formed in the second surface of the mold block 138. The first surface 140 includes a stem press or glass-contacting portion 146 having a centrally disposed projection 148 extending away from the stem press portion. A plurality longitudinal openings 150 having a constant diameter of 2.91 mm (0.1145 inch) are drilled on a 15.44 mm (0.608 inch) diameter pin circle through the mold block 138 from the first surface 140 to the cavity 144 in the second surface 142. Preferably fourteen holes are drilled to produce any type of stem commonly used for electron tubes. The larger diameter openings 150 can be drilled faster and more accurately than the precision 0.89 mm (0.035 inch) diameter conventional lead-accommodating apertures 40 in prior mold blocks. Preferably, the stem mold 135 is formed of 440C or 416 stainless steel which is easy to machine.

Figure 7:
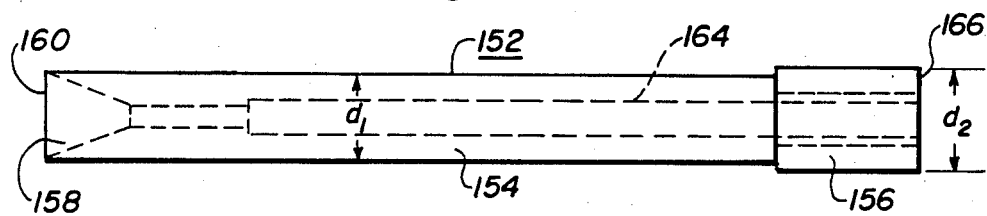
FIG. 7 shows a fillet-forming insert of the present invention.

A plurality of fillet-forming inserts 152, one of which is shown in FIG. 7, are provided for use in combination with the mold block 138. Each of the inserts 152 includes a main body comprised of a shank portion 154 having a first diameter, $d_1$, and a shoulder portion 156 having a second diameter, $d_2$, larger than the first diameter $d_1$. A recess 158 is formed in a first end 160 of the insert 152 and a lead-accommodating opening 162 is formed through at least a portion of the shank of the insert 152 from the recess 158. A channel 164 is formed in the insert 152 and extends from the oppositely disposed second end 166 to the opening 162. In the preferred embodiment, each of the inserts has a first outside diameter, $d_1$, of 2.87 mm (0.113 inch) and a second outside diameter, $d_2$, of 3.175 mm (0.125 inch). The recess 158 has a truncated conical shape which subtends a half angle of about 20°. The flared portion of the recess opens into the first end 160 of the insert. The narrow end of the recess 158 terminates into the lead-accommodating opening 162 which has a diameter of about 0.79 mm (0.0312 inch). The channel 164 has a diameter of about 1.17 mm (0.046 inch). Insert 152 has a length within the range of about 26.2 mm (1.033 inch) to 29.3 mm (1.153 inch) long; however, the length is dependent on the thickness of the mold block 138 or on the forming station as described in my copending patent application filed concurrently herewith and entitled, Universal Stem Mold Apparatus. The length of the channel 164 is typically about 22.43 mm (0.883 inch) long. The portion of the channel 164 adjacent to the second end 166 is tapped to accommodate a lead stop 168 described hereinafter. Preferably, the inserts 152 are formed from 446 stainless steel which is resistant to the formation of oxidation and scale at glass molding temperatures.

Figure 8:
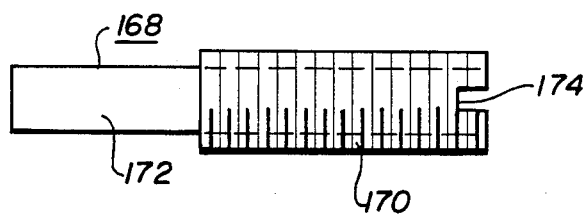
FIG. 8 shows a lead-stop of the present invention.

As shown in FIG. 8, the lead stop 168, comprising a pin which is disposed within the channel 164, e.g., see FIG. 6, to act as a contact surface or stop for the inner leads 30 (or 30') of the stem 20 (or 20'). The length of the pin 168 is selected to accommodate the length of the inner leads. Each of the pins 168 has a threaded head portion 170 and a cylindrical body 172 integral therewith which has a diameter of about 1.02 mm (0.040 inch) and closely conforms to the channel 164. A slot 174 is formed in the head portion 170 to permit the pin 168 to be threaded into the second end 166 of the insert 152.

GENERAL CONSIDERATIONS

With reference to FIG. 6, in order to make a stem 20' having inner leads 30' of different lengths, the novel universal stem mold 135 is fitted with a plurality of removable inserts 152. The inserts 152 are first placed within the pin apertures 68 of the conventional pin holder 66. The pin apertures 68 have a diameter of about 2.95 mm (0.116 inch) which is larger than the first diameter, $d_1$ (2.87 mm) of the inserts 152. Each of the inserts 152 is fitted with a pin 168 of the proper length to provide a lead stop for the inner leads 30'. The pin holder 66 is then attached to the translator 58 by means of screws 70 (only one of which is shown). The subassembly comprising the pin holder 66, translator 58 and inserts 152 and 152', discussed hereinafter, is then disposed within the recess 144 of the mold block 138 so that the inserts 152 and 152' are disposed within the openings 150 in the mold block. About 0.04 mm of clearance is provided for the inserts 152 and 152' so that they can be removed when worn or when it is desired to change either the length of the inner leads 30' or the lead diameter (which would require an insert with a lead-accommodating opening of sufficient diameter).

Additionally, stems with one or more dummy fillets 25', can be manufactured using the universal stem mold 135 and one or more inserts 152' without lead-accommodating openings, i.e. solid inserts 152' as shown in FIG. 6. Dummy fillets 25' are frequently used on either side of a lead which carries a voltage of several kilovolts in order to provide greater electrical isolation by physically increasing the distance from the high voltage lead to the adjacent leads.

With the inserts 152 and 152' disposed within the universal stem mold 135, stems are manufactured by a known fabrication process such as that described in the above-referenced Handmann patent. The dummy fillets 25' are formed by pressing molten glass into the openings 150 in the mold block 138 having the inserts 152' therein. The length of the insert 152' acts to control the height of the dummy fillet by regulating the amount of glass pressed into the openings 150.

What is claimed is:

1. In an apparatus for manufacturing a glass stem for an electron tube having a plurality of lead-in conductors and a plurality of fillets, said lead-in conductors extending through said fillets, said apparatus comprising a first stem mold assembly and a second stem mold assembly for forming said stem therebetween, said first stem mold assembly having fillet-forming means therein, the improvement wherein said first stem mold assembly comprises
   a universal stem mold having a plurality of longitudinal fillet-forming openings formed through a mold block; and
   a plurality of inserts each being replaceably disposed and retained within a different one of said openings in said mold block, each of said inserts having a first end, an oppositely disposed second end and a shank portion therebetween, said inserts including a recess provided in said first end and a lead-accommodating opening extending from said recess into said shank portion of each insert.

2. In an apparatus for manufacturing a glass stem for an electron tube having a plurality of lead-in conductors of different internal lengths and a plurality of fillets, said lead-in conductors extending through said fillets, there being at least one dummy fillet without a lead-in conductor extending therethrough, said apparatus comprising a first stem mold assembly and a second stem mold assembly for forming said stem therebetween, said first stem mold assembly including retaining means and fillet forming means, the improvement wherein said first stem mold assembly comprises:
   a universal stem mold having a plurality of longitudinal fillet-forming openings formed through a mold block; and
   a plurality of inserts each being being replaceably disposed within a different one of said openings in said mold block, each of said inserts having a first end, and oppositely disposed second end and a shank portion therebetween, said inserts including recess provided in said first end and a lead-accommodating opening formed in said insert, said opening extending from said recess into said shank portion of said insert, termination means disposed within said insert, said termination means providing a stop for said leads, said second end of each of said inserts being in contact with said lead-weights to retain said inserts within said openings in said mold block.

3. The apparatus as described in claim 2, wherein at least one solid insert is replaceably disposed within said openings in said mold block to produce said dummy fillet.

4. In an apparatus for manufacturing a glass stem for an electron tube having a plurality of lead-in conductors of different internal lengths and a plurality of fillets, said lead-in conductors extending through said fillets, there being at least one dummy fillet without a lead-in conductor extending therethrough, said apparatus comprising a first stem mold assembly and a second stem mold assembly for forming said stem therebetween, said first mold assembly including a plurality of lead-weights and a mold block having a first surface and an oppositely disposed second surface with a cavity formed in said second surface of said mold block, said mold block having fillet forming means therein, a lead-weight translator disposed within said cavity, said translator having a first surface and a second surface with a translator recess formed in one of said surfaces and a plurality of lead-weight apertures extending from said translator recess through the other surface thereof, and holder means disposed within said translator recess, said holder means having a plurality of apertures therethrough, the improvement wherein said first stem mold assembly comprises:
   a universal stem mold having a plurality of longitudinal fillet-forming openings formed through said mold block and aligned with said apertures in said holder means, and
   a plurality of inserts, each of said inserts being replaceably disposed within a different one of said openings in said mold block and within said aligned apertures in said holder means, each of said inserts having a shank portion and a shoulder portion, said shank portion having a first end and said shoulder portion having an oppositely disposed second end, said first end of each of said inserts having a recess provided therein with a lead-accommodating opening extending through said inserts and terminating in a lead-stop, said shoulder having a diameter greater than that of said shank portion to prevent said inserts from passing through said apertures in said holder means, said second end of each of said inserts being in contact with a different one of said lead-weights to retain said inserts within said apertures in said holder means.

5. The apparatus as described in claim 3, wherein said lead-stop comprises a pin secured within said insert.

6. The apparatus as described in claim 3, wherein said inserts are formed from a material different from that used to form said mold block.

7. The apparatus as described in claim 4, wherein at least one solid insert is replaceably disposed within said openings in said mold block to produce said dummy fillets.

* * * * *